United States Patent [19]

Land

[11] 4,179,199
[45] Dec. 18, 1979

[54] COMBINATION MOTION PICTURE CAMERA AND VIEWING APPARATUS

[75] Inventor: Edwin H. Land, Cambridge, Mass.

[73] Assignee: Polaroid Corporation, Cambridge, Mass.

[21] Appl. No.: 506

[22] Filed: Jan. 2, 1979

[51] Int. Cl.² .................................................. G03B 19/18
[52] U.S. Cl. ..................................... 352/138; 352/72; 352/78 R; 352/129
[58] Field of Search ................. 352/78 R, 138, 129, 352/136, 141, 72; 354/219, 222, 224, 225

[56] References Cited

U.S. PATENT DOCUMENTS

| | | |
|---|---|---|
| 1,624,103 | 4/1927 | Knopp . |
| 1,774,097 | 8/1930 | Hauser et al. .......................... 352/136 |
| 2,282,991 | 5/1942 | De Rose . |
| 2,854,903 | 10/1958 | Land et al. . |
| 2,883,904 | 4/1959 | De Rose . |
| 3,225,670 | 12/1965 | Friedman et al. . |
| 3,237,541 | 3/1966 | Gallagher . |
| 3,575,081 | 4/1971 | Nerwin . |
| 3,615,127 | 10/1971 | Land ................................ 352/78 R |

FOREIGN PATENT DOCUMENTS 847564 10/1939 France .

Primary Examiner—Monroe H. Hayes
Attorney, Agent, or Firm—Frederick A. Goettel, Jr.

[57] ABSTRACT

Apparatus is provided for permitting viewing of images carried by a motion picture film strip contained within a film cassette, of the type having a permanent prismatic reflective element at its exposure/projection station, through the taking lens of a motion picture camera. The viewing apparatus includes means for cooperating with the movie camera and the cassette for directing light into the reflecting prism to result in projection of the image carried by the frame of the film strip at the projection station along the taking lens axis of the camera. An optical viewing attachment is provided for establishing visual access along the lens axis. The viewing attachment includes an objective lens disposed along the lens axis to receive an aerial image formed by the camera's taking lens, and a reflective element disposed along the lens axis outwardly from the objective lens to receive the image formed by the objective lens and to direct this image along a viewing axis substantially perpendicular to the lens axis. An adjustable eye piece element is disposed along the viewing axis to permit focusing and viewing therethrough of the image directed thereto by the reflective element.

3 Claims, 4 Drawing Figures

COMBINATION MOTION PICTURE CAMERA AND VIEWING APPARATUS

BACKGROUND OF THE INVENTION

1. Field of the Invention

This invention relates to photographic motion picture cameras and, more particularly, to apparatus for permitting viewing of images carried by a motion picture film strip contained within a film cassette having a permanent prismatic reflective element at the exposure/projection station, through the taking lens of the camera.

2. Description of the Prior Art

In recent years, advances of tremendous significance have been made in the photographic arts. Among the most recent have been developments which have virtually eliminated the traditional time delay associated with the processing of motion picture film. These developments have provided systems which permit the photographer to view the results of his work immediately after the exposure process has been completed. Most advantageously, such systems provide a film handling cassette from which the film need never be removed during exposure, developing, projecting and editing procedures. Such systems are described in U.S. Pat. Nos. 3,584,944 issued June 15, 1971 in the name of Gerald H. Cook; 3,597,062 issued Aug. 3, 1971 in the name of Rogers B. Downey; 3,615,127 issued Oct. 26, 1971 in the name of Edwin H. Land; and 3,584,942 issued June 15, 1971 in the name of Rogers B. Downey, all of which are assigned to the assignee of the present invention.

A particularly unique feature of such systems is best described in the above-identified U.S. Pat. No. 3,615,127 to Land wherein there is described a compact motion picture film handling cassette adapted to facilitate film exposure operations when mounted in a camera and film processing and projection operations when mounted in a projector or viewer. Such a cassette is supplied with a strip of unexposed photographic film interconnected between a pair of reels and includes a film exposure/projection station to facilitate exposure and projection operations, and a film processing station. Exposure of the film may be effected during a first advancement of the film from the supply reel to the takeup reel across the exposure/projection station. Processing is then effected as the exposed film is returned through the processing station to the supply reel, and drying and exposure operations of the developed film are effected as it is once again advanced from the supply reel across the exposure/projection station onto the takeup reel.

An especially important feature of such cassette is the fact that a prism is mounted behind the film at the exposure/projection station. The prism is adapted to admit light directed through it by a condenser system in the projector. The projection light is directed into the side of the cassette and reflected by a reflecting surface of the prism through the film and outwardly through projection optics included in the projector. This prism is mounted as a permanent part of the cassette and simplifies the optics and the mechanical features of the projector adapted to receive the cassette. The prism is also responsible for maintaining the effective aperture of the projection optics within a limited space, whereas a mirror-type reflector would significantly reduce the effective aperture within the same space. It also permits the cassette to be introduced simply into a projector without the necessity of introducing optical portions of the projector into the cassette structure or of pulling the film from the cassette to thread it through a projection station.

The above-cited U.S. Pat. No. 3,615,127, points out further that the incorporation of a permanent prismatic element at the exposure/projection station makes it possible to modify a camera adapted to use such a cassette so that it may be used for viewing developed film. More specifically, it points out that by incorporating in the camera a source of light adjacent the entrance of the prismatic element, the camera may be used to view the film directly through the lens of the camera. Such a light source may comprise, for example, a normally closed but openable light collecting lens or window or, alternatively, a built-in examination light for directing light into the prism.

It has been found that such direct viewing through the lens of a camera does not produce a good viewable image and it is towards a satisfactory arrangement wherein film carried by such a multipurpose film cassette may be viewed within a camera that the present invention is directed.

SUMMARY OF THE INVENTION

The present invention generally relates to apparatus for permitting viewing of images carried by a motion picture film strip within a cassette of the type described hereinabove wherein a prism is mounted in the cassette adjacent to a film projection station on the opposite side of the film from the projection station to form a portion of an optical projection system. The viewing apparatus comprises a movie camera adapted to receive and operatively engage the cassette to effect movement of the film past the projection station. The camera includes a taking lens having a lens axis passing through the projection station and operative in an exposure mode for recording scene images on unexposed film. The viewing apparatus further includes means for cooperating with the movie camera and the cassette for directing light into the reflecting prism to result in projection of the image carried by the frame of the film strip at the projection station along the lens axis of the camera. An optical viewing attachment is provided for establishing visual access along the lens axis of the camera for viewing of images projected therealong. The optical viewing apparatus includes an objective lens disposed along the lens axis to receive an aerial image formed by the camera's taking lens. The viewing attachment also includes a reflective element disposed along the lens axis outwardly from the objective lens to receive the image formed by the objective lens and to direct this image bearing light along a viewing axis substantially perpendicular to the lens axis. An adjustable eye piece element is disposed along the viewing axis to permit focusing and viewing therethrough of the image directed thereto by the reflective element.

BRIEF DESCRIPTION OF THE DRAWINGS

The novel features that are considered characteristic of the invention are set forth with particularity in the appended claims. The invention itself, however, both as to its organization and its method of operation will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
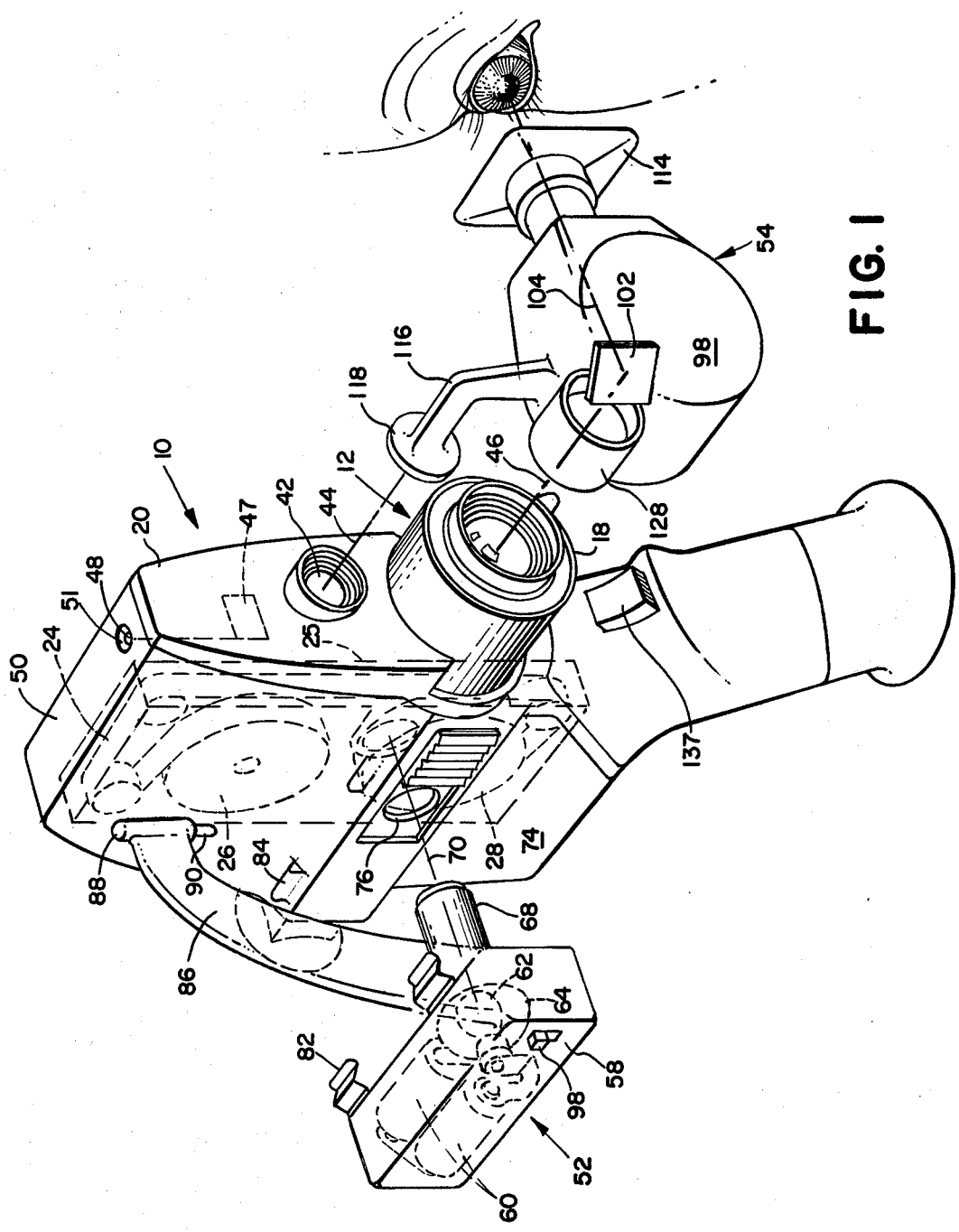
FIG. 1 is a partially exploded perspective view of a motion picture camera embodying the viewing features of the present invention.

Referring now to FIG. 1, there is shown at 10 a cassette load motion picture camera which is provided with an optical viewing arrangement according to the present invention. The camera includes an objective taking lens generally designated at 12 which comprises a prime lens 14 in combination with an afocal zoom lens 16. In a preferred embodiment, the camera may have a f/1.8 lens with a 2:1 zoom ratio and a two position switch (not shown) to allow selection between near and far focus ranges. The zoom portion of the objective taking lens 12 is adjusted by rotation of a lens barrel 18. The camera further includes a camera body 20 adapted to receive a cassette containing a supply of motion picture film and to feed the film past an exposure/projection station generally designated at 22. A film cassette 25 generally of the type described in the above-referenced U.S. Pat. No. 3,615,127, which patent is hereby incorporated herein by reference thereto, is shown in a simplified manner mounted within the camera body 20 for operative relation therewith for transport of the film strip 24 carried by the cassette supply reel 26 past the exposure/projection station 22 of the camera to a takeup reel 28. The film cassette 25 further includes a reflective prismatic element 30 which is adapted to be in operative relation with the illumination system of a projector to receive a converging cone of projection light through a first transparent face 32 and to redirect the beam of light upon impingement upon an angularly disposed reflecting face 34 through a second transparent face 36 and thence through the frame 38 of the film strip 24 positioned at the exposure/projection station 22 and from there through the projector's lens system of ultimate viewing upon a screen which may, for example, be a remote screen or of the rear projection type.

A suitable intermittent drive mechanism (not shown) is provided within the camera 10 and adapted in a conventional manner to advance the film strip and drive a shutter 31 (shown schematically in FIG. 4) at regulated speeds through a conventional drive train (not shown). The shutter and its control system may, for example, be similar to that described in U.S. Pat. No. 3,751,149, which patent is assigned to the assignee of the present invention.

Again, as is conventional, the motion picture camera 10 is provided with a suitable exposure control system which is adapted to permit photographic images to be taken by the camera under extreme over exposure and under exposure lighting conditions. Such a system includes an electric eye or photocell 42 positioned along an axis 44 spaced from and substantially parallel to the axis 46 of the taking lens assembly 12. The photocell 42 operates in a conventional manner to sense the intensity of the light in the field of view of the camera, and to thereby create a resistivity change in a circuit which is a function of the sensed light intensity. The photocell 42 is electrically coupled by suitable means to thereby control the exposure aperture along the taking lens axis 46 thereby controlling the amount of light passing into the camera to the film projection station 22. An arrangement typical of such an exposure control system is described in detail in U.S. Pat. No. 3,810,207, entitled "Exposure Control System" and assigned to the assignee of the present invention.

The present motion picture camera 10, again as is conventional, is adapted tobe used both to record moving images outdoors during daylight conditions and also indoors with artificial light provided by a movie light system. With this in mind, the camera is provided with a daylight filter arrangement, shown only schematically at 47 in the drawing, whereby a suitable filtering material is disposed along both the automatic exposure system photocell axis 44 and the taking lens axis 46 to thereby filter the amount of light passing to both the photocell 42 and the film strip during daylight picture taking. The daylight filter is adapted to be removed from the path of light to both the photocell 42 and the taking lens 12 during exposure under artificial movie lights. Removal of the filter 47 is accomplished, in the present camera, by depression of a normally upwardly spring loaded button 48 provided in the top 50 of the camera. The button 48 is adapted to be depressed downwardly, thereby displacing the daylight filter 47 from the daylight to the artificial light position, by the attachment of a suitable movie light (not shown) thereto. Depression of the button in this manner is achieved by installation of the movie light, which sits on top of the camera and is attached by a thumbscrew which is adapted to be threaded into mating threads in the opening 51 which surrounds the spring loaded button 48.

As best seen overall in FIG. 1, the camera 10 of the present invention is adapted to operably receive a pair of add-on accessories which facilitate viewing of a processed film strip contained within a cassette 25 operably disposed within the camera. The first of these add-on accessories is an illumination attachment 52 which is adapted, as will be described in detail hereinbelow, to direct a beam of image projecting light into the first face 32 of the cassette contained prism 30. The other of the pair of attachments is optical viewing accessory 54 which is adapted to mount on the front of the camera and to cooperate with the optical system of the camera to facilitate viewing of the images carried by the cassette contained film strip.

Figures 2, 3, 4:
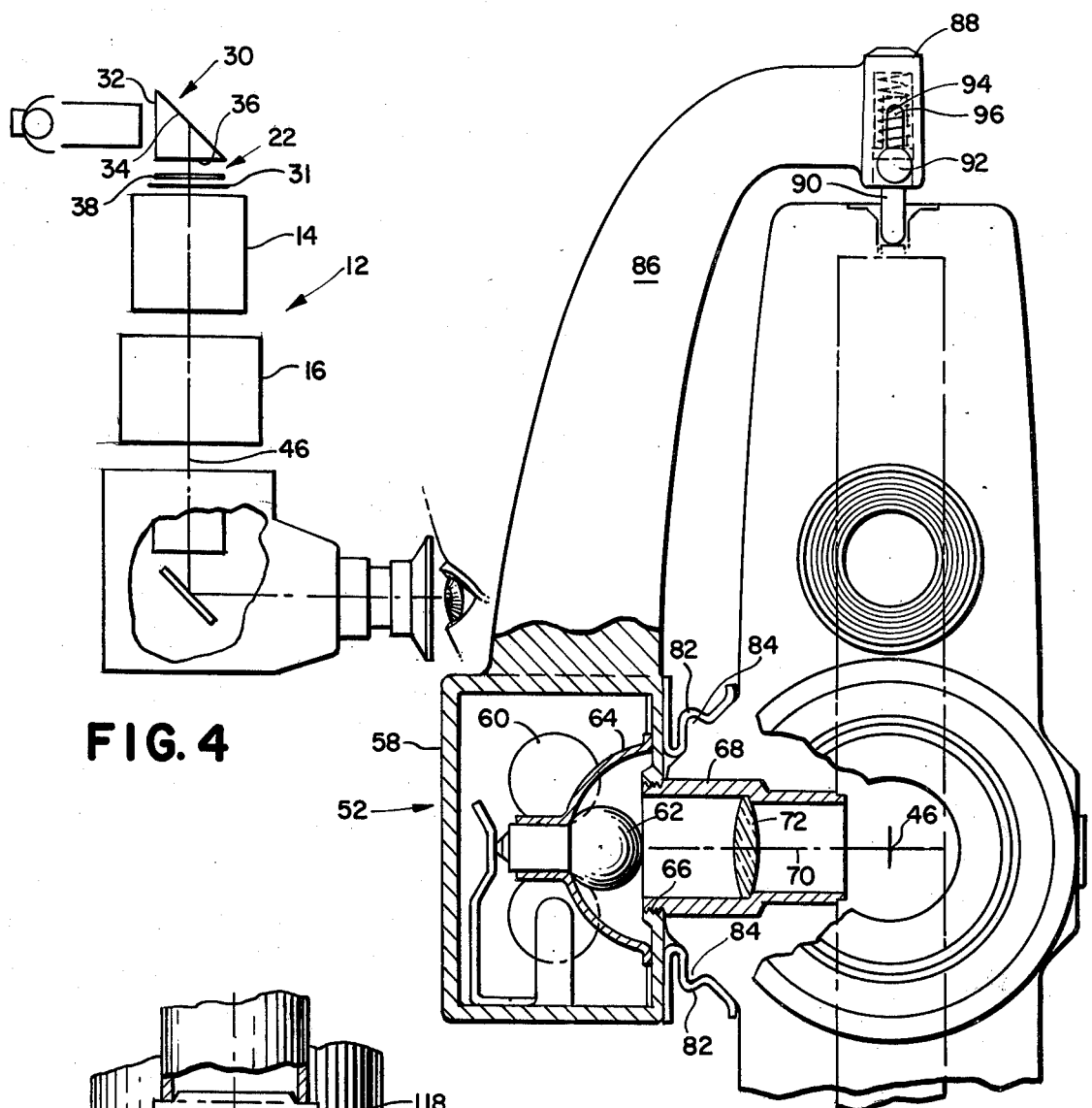
FIG. 2 is a partially broken away front elevational view of a portion of the camera of FIG. 1.
FIG. 3 is a sectional plan view of the lens barrel and viewing attachment of the motion picture camera of FIG. 1.
FIG. 4 is a simplified schematic illustrating the interaction between the optical elements of the motion picture camera and the viewing apparatus of the present invention.

The illumination accessory 52 generally comprises an elongated rectangular container 58 which is adapted to house means for directing illumination into the side of the cassette contained prism 30. The illumination means is of a conventional type and typically will include a set of batteries 60 for providing a source of electrical energy and an illumination lamp 62 mounted within a reflector element 64 which in turn is disposed within the container 58 in a manner to direct the illumination out of an opening 66 in the side of the container. An elongated tubular element 68 is threadably engaged into the opening 66 in the side of the container 58 and establishes an illumination light path 70 from the light source into the camera interior to a location immediately adjacent the outwardly facing face 32 of the prism 30. As shown in FIG. 2, a lens 72 may be provided in the tubular element 68 to control the path of the light passing therethrough along the illumination light path 70, although such a lens is not necessary for satisfactory performance of the system.

Again with reference to FIGS. 1 and 2, the camera side wall 74 adjacent the prism's outer face 32 is provided with a circular opening 76 adapted to slidably receive the tubular element 68. A slidable cover 78 which may be selectively positioned to open or close the opening 76 in the side of the camera for the viewing or exposure mode operation of the camera, respectively, is mounted in tracks 80 provided in the camera side wall 74. A pair of resilient tabs 82 are provided at both the top and bottom of the container 58 and are adapted to snap fit into complementary structure such as protrusions 84 provided on the camera side wall 74, again as shown in FIGS. 1 and 2.

The illumination accessory 52 is also provided with an upwardly extending arm 86 which extends from the container 58 and which terminates in a vertically extending cylindrical section 88 which overlies the opening 51 in the top of the camera wherein the button 48 which disables the daylight filter 47 is located. A daylight filter disabling pin 90 is slidably mounted within the cylindrical section 88 and extends downwardly through an opening in the lower end thereof. The pin is provided with an integrally formed knob 92 which passes through an elongated slot 94 in the cylindrical section 88 to the exterior thereof to provide manual access thereto. A coil spring 96 is mounted within the cylindrical section 88 to engage the upper end of the pin 90 to spring bias the pin downwardly with a force greater than that of the spring force biasing the daylight filter button 48 upwardly. Accordingly, to attach the illumination means to the camera, the knob 92 is manually pulled upwardly through the slot 94, thereby retracting the disabling pin 90, permitting the illumination means container 58 to be snapped onto the camera as shown in FIG. 2. Following such attachment, the knob 92 may be released and the disabling pin 90 will extend downwardly, extending into the opening 51 thereby depressing the button 48 and accordingly, removing the daylight filter from its exposure mode position along the lens axis 46 of the camera.

A suitable conventional on/off switch 98 is provided on the side of the illumination means container 58 to actuate the light source as desired. Accordingly, referring to FIG. 4, when the illumination accessory 52 is installed on the camera as shown in FIG. 2, and the illumination source is actuated, a beam of projection light will be directed through the cylindrical tube 68, pass through the first face 32 of the prism 30, be reflected off the reflective face 34 of the prism, whereupon it will pass outwardly through the second face 36 of the prism and through the frame 38 of the film strip which is currently at the exposure/projection station 22. The image bearing light then passes through the region of the shutter 31 and from there through the prime lens 14 and the zoom lens 16 of the camera. The image exiting from the zoom lens of the camera comprises an aerial image which will not permit satisfactory viewing of the entire field of the projected image and thus, the viewing accessory 54, which is adapted to be attached to the lens barrel 18 of the camera, is designed to receive this image and to provide a good viewable image at the eye piece as will now be described in detail.

Referring now to FIGS. 1 and 3, the viewing accessory 54 comprises a substantially cylindrical hollow main body member 98 in which are housed an objective lens 100 which is arranged to receive the aerial image formed by the camera's taking lens 12 to form a viewable image which continues outwardly along the lens axis 46. The viewing accessory 54 also includes a reflective element 102 which is disposed along the lens axis 46 outwardly of the objective lens 100 with its reflective surface oriented substantially 45° with respect to the lens axis. This reflective element 102 accordingly directs the image formed by the objective lens 100 along a final viewing axis 104 substantially perpendicular to the lens axis of the camera and serves to reverse the image left-to-right to provide the proper left/right orientation of the final image. The viewing axis 104 passes through a opening 106 in the side of the main body 98 of the viewing accessory and to an eye piece lens 108 which is mounted in a tubular eye piece assembly 110 slidably disposed in lateral extension 112 of the main body 98. The eye piece assembly 110 may thus be suitably adjusted to focus upon the image directed along the viewing path 104 to permit viewing through a flexible eye piece element 114 which is disposed at the outer end of the eye piece assembly 110.

As best seen in FIG. 1, an upwardly and rearwardly extending arm 116 is integrally formed with the viewing accessory housing 98. This arm 116 terminates in a disc-shaped element 118 which is adapted to fit into and block off the photocell 42 of the exposure control system electric eye, thereby causing the exposure control system to provide a maximum aperture along the viewing axis 46 of the camera to facilitate the viewing mode of operation.

The viewing accessory 54 is assembled to the camera by simply sliding an annular skirt 120 formed in the rear portion of the cylindrical body 98 into engagement with the outer surface of the lens barrel 18. Suitable dimples 122 and dimple receiving detents 124 may be provided in the lens barrel 18 and the inner wall 126 of the skirt of the viewing accessory, respectively, to assure positive retention of the accessory 54 when installed on the camera. Referring to FIG. 3, it will be seen that the objective lens element 100 is mounted within the cylindrical housing 98 in a cylindrical tube 128 not forming an integral part of the housing 98. The tube, with the lens 100 retained therein by means of an integrally formed shoulder 123 and a snap ring 125, is slidably received within an annular bore 127 formed within the housing 98. A helical spring 129 surrounds the tube 128 and is received in an annular chamber 131 within the bore 127. This spring is retained at its respective ends by a seat 133 formed at the inner end of the annular chamber 131 and a snap ring or the like 135 carried in the outer wall of the tube 128. This arrangement serves to bias the tube 128 outwardly, yet will permit movement of the tube, against the spring force, in the direction of the reflective element 103.

This tube 128 is made from a material which will not mar the outermost element 130 of the camera lens and contacts this outermost element of the lens when the accessory is installed. Accordingly, this contact between the end of the tube 128 and the lamp 130 provides the proper registration of the objective lens 100 with the optical system of the camera itself. Once contact of the end of the tube 128 is made with the lens 130, further advancement of the viewing accessory towards the camera will result in movement of the spring loaded objective lens tube 128 towards the reflective element 102 until the viewing accessory 54 has been properly seated on the camera.

Accordingly, it will be appreciated that with the illumination accessory 52 and the viewing accessory 54 mounted upon the camera as described hereinabove, upon actuation of the illumination accessory and the transport system of the motion picture camera by its conventional actuating switch 137, the images carried by the film strip within the cassette 25 mounted in the camera, may be viewed through the eye piece of the optical viewing accessory.

It should be appreciated that the present invention may be practiced or embodied in still other ways without departing from the spirit or essential character thereof. The preferred embodiments described hereinabove are therefore illustrative and not restrictive, the scope of the invention being indicated by the appended claims and all variations which come within the meaning of the claims are intended to be embraced therein.

What is claimed is:

1. Apparatus for permitting viewing of images carried by a motion picture film strip contained within a cassette of the type wherein projection illumination may be directed to the backside of the film strip by a reflecting prism mounted within the cassette behind the film plane at a projection station; said apparatus comprising a movie camera adapted to receive and operatively engage the cassette to effect movement of the film past said projection station, said camera including a taking lens having a lens axis passing through said projection station and operative in an exposure mode for recording scene images on unexposed film; said apparatus further comprising means for cooperating with said movie camera and the cassette for directing light into said reflecting prism to result in projection of the image carried by the frame of the film strip at the projection station along the lens axis of said camera; and said apparatus further comprising an optical viewing system for providing visual access along said lens axis of said camera for viewing of said images projected therealong, said optical viewing means comprising; an objective lens disposed along said lens axis to receive an aerial image formed by the camera's taking lens, a reflective element disposed along said lens axis outwardly from said objective lens to receive the image formed by said objective lens and to direct said image bearing light along a viewing axis substantially perpendicular to said lens axis, and, an eye piece element disposed along said viewing axis for focusing and viewing therethrough said image directed thereto by said reflective element.

2. The apparatus of claim 1 wherein said motion picture camera further comprises an automatic exposure control system which is actuated when said camera is actuated to effect movement of the film past said projection station, said exposure control system operating to control an aperture along said taking lens axis and to provide a maximum aperture along said axis when a minimum of light is sensed by said exposure control system and wherein said optical viewing means is provided with means for blocking the passage of scene light to said exposure control system to thereby result in a maximum aperture along said taking lens axis.

3. The apparatus of claim 1 or 2 wherein said motion picture camera is provided with a daylight filter element which is positioned along said taking lens axis under normal outdoor exposure conditions and wherein said camera includes mechanically actuatable means carried by said camera for removing said daylight filter from along said taking lens axis, said means for directing light into said prism further comprising means for cooperating with said mechanically actuatable means for thereby removing said daylight filter from along said taking lens axis when said means for directing light is operatively cooperating with said camera.

* * * * *